(12) United States Patent
James

(10) Patent No.: US 9,829,885 B2
(45) Date of Patent: Nov. 28, 2017

(54) PERSONAL STORAGE FOR SHARED VEHICLES

(71) Applicant: Toyota Motor Engineering & Manufacturing North America, Inc., Erlanger, KY (US)

(72) Inventor: Michael R. James, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/944,684

(22) Filed: Nov. 18, 2015

(65) Prior Publication Data
US 2017/0139413 A1 May 18, 2017

(51) Int. Cl.
*G05D 1/00* (2006.01)
(52) U.S. Cl.
CPC .................. *G05D 1/0088* (2013.01)
(58) Field of Classification Search
CPC ...................................... G05D 1/0088
See application file for complete search history.

(56) References Cited

U.S. PATENT DOCUMENTS

| 5,289,369 | A | 2/1994 | Hirshberg |
| 8,768,565 | B2 | 7/2014 | Jefferies et al. |
| 8,989,053 | B1 * | 3/2015 | Skaaksrud ............ H04W 12/06 370/255 |
| 2014/0222298 | A1 | 8/2014 | Gurin |

OTHER PUBLICATIONS

U.S. Appl. No. 15/257,472, filed Sep. 6, 2016.

* cited by examiner

*Primary Examiner* — Michael D Lang
(74) *Attorney, Agent, or Firm* — Christopher G. Darrow; Darrow Mustafa PC

(57) ABSTRACT

Arrangements relating to personal storage with shared vehicles are described. A shared vehicle, a user device, a storage computing system, and/or a storage depot can be communicatively linked. A storage request can be sent from one of the computing systems. One or more storage parameters can be determined, and storage instructions can be sent based on the determined storage parameters. The storage instructions can provide routing instructions to a vehicle and loading instructions to a storage depot. Storage depots can automatically transfer storage compartments between storage space and a vehicle through the use of robotics. Systems and methods described herein can be implemented with shared autonomous vehicles.

24 Claims, 5 Drawing Sheets

FIG. 3
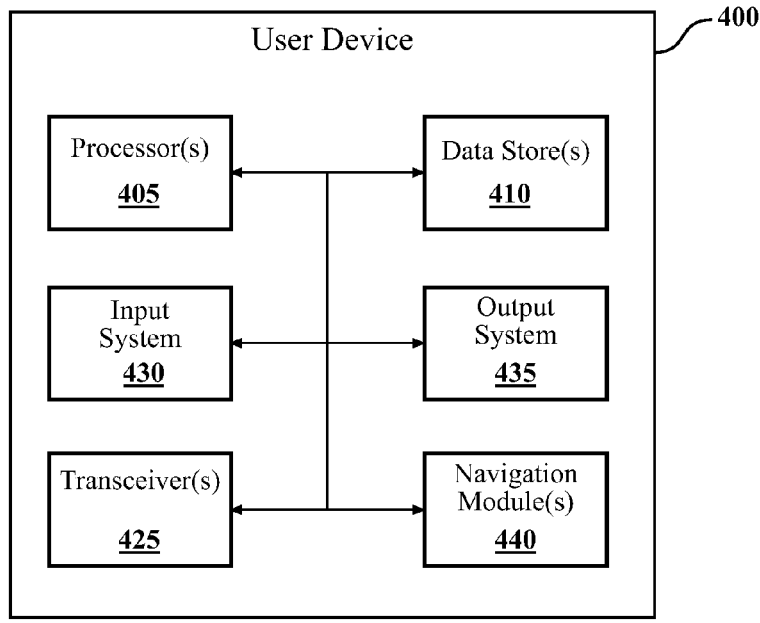
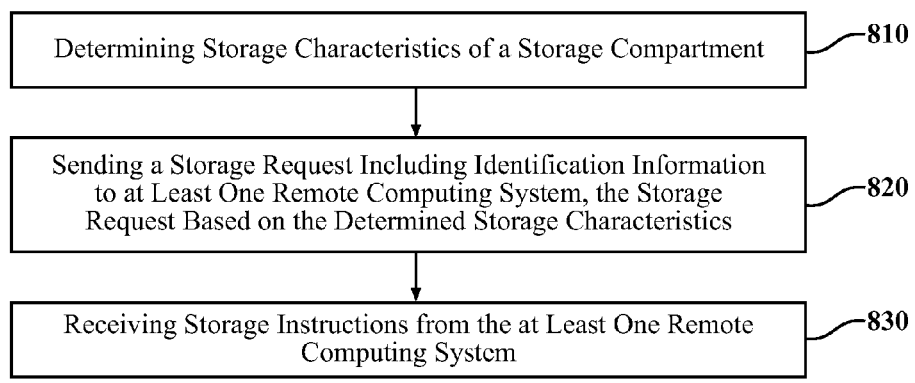
FIG. 8

PERSONAL STORAGE FOR SHARED VEHICLES

FIELD

The subject matter described herein in general to personal storage and, more particularly, to personal storage for shared vehicles.

BACKGROUND

The sharing of vehicles can allow for several individuals to utilize the same vehicle. Shared vehicles can, for example, be rented to individual users for a period of time. Sharing vehicles can provide users with access to transportation without the costs and responsibilities of ownership. Shared vehicles can also help to reduce traffic congestion and pollution. The development of autonomous vehicles or highly automated vehicles can increase the accessibility of shared vehicles. For example, autonomous vehicles can automatically pick up and drop off customers at locations separate from a location in which the vehicle is stored.

SUMMARY

In one respect, the present disclosure is directed to a method of managing personal storage for a shared vehicle. The method can include receiving a storage request that can include identification information. Responsive to receiving the storage request, the method can further include determining one or more storage parameters. The method can include determining one or more storage instructions based on the determined one or more storage parameters. The method can further include sending the determined one or more storage instructions to at least one remote computing system.

In another respect, the present disclosure is directed to a system for managing personal storage for a shared vehicle. The system can include a processor communicatively linked to at least one remote computing system. The processor can be programmed to initiate executable operations. The executable operations can include determining one or more storage parameters in response to receiving a storage request including identification information. The executable operations can further include determining one or more storage instructions based on the determined one or more storage parameters. The executable operations can also include sending the determined one or more storage instructions to at least one remote computing system.

In another respect, the present disclosure is directed to a method for managing personal storage for a shared vehicle. The method can include determining storage characteristics of at least one storage compartment operatively connected to the shared vehicle. The method can also include sending a storage request including identification information to at least one remote computing system, where the storage request is based on the determined storage characteristics. Further, the method can include receiving storage instructions from the at least one remote computing system, the storage instructions including instructions for loading or unloading the at least one storage compartment.

In another respect, the present disclosure is directed to a system for managing personal storage for a shared vehicle. The system can include a processor communicatively linked to at least one remote computing system. The processor can be programmed to initiate executable operations. The executable operations can include determining storage characteristics of at least one storage compartment operatively connected to the shared vehicle. The executable operations can also include sending a storage request including identification information to at least one remote computing system, where the storage request can be based on the determined storage characteristics. Further, the executable operations can include receiving storage instructions from the at least one remote computing system, where the storage instructions include instructions for loading or unloading the at least one storage compartment.

In still another respect, the present disclosure is directed to a system for personal storage with shared vehicles. The system can include one or more robots being configured to engage a portable storage compartment, and the one or more robots can be located at a storage depot. The system can further include a processor communicatively linked to the one or more robots. The processor can be programmed to initiate executable operations. The executable operations can include determining one or more storage parameters in response to receiving a storage request including identification information. The executable operations can further include determining one or more storage instructions based on the determined one or more storage parameters. The one or more storage instructions can include instructions to transfer a storage compartment between a shared vehicle located at the vehicle receiving area and an individual storage space. The executable operations can include sending the determined one or more storage instructions to the one or more robots to cause the robots to implement the storage instructions.

BRIEF DESCRIPTION OF THE DRAWINGS

FIG. 3 is an example of a user device.

FIG. 8 is an example of another method for managing personal storage for shared vehicles.

DETAILED DESCRIPTION

Figure 1:
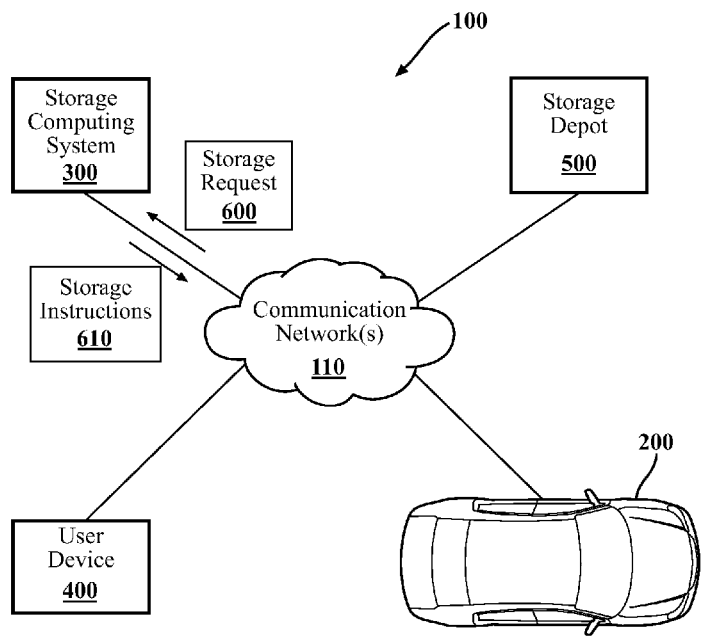
FIG. 1 is an example of a personal storage system for shared vehicles.

This detailed description relates to personal storage for shared vehicles. Arrangements described herein can facilitate efficient storage, retrieval, and/or transfer of personal items and/or personal storage compartments with shared vehicles. Systems can include a shared vehicle, a user device, a storage computing system, and/or a storage depot. A storage request can be received from at least one remote computing system (e.g., the shared vehicle, a user device, and a storage depot). The storage request can include identification information. One or more storage parameters can be determined in response to receiving the storage request. Examples of the storage parameters can include which storage depot the vehicle should be routed to or taken from, an individual space within the storage depot in which to store a vehicle or a storage compartment, an individual space within the storage depot from which to retrieve a vehicle or storage compartment, a route for the vehicle, and/or a target time for the vehicle to be present at the storage depot. Storage instructions can be sent based on the determined one or more storage parameters. Examples of the storage instructions can include vehicle routing information and/or storage depot loading instructions. The storage depot can include storage space and one or more robots to automate loading/unloading processes.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is an example of a system 100 for personal storage with shared vehicles. Some of the possible elements of the system 100 are shown in FIG. 1 and will now be described. It will be understood that it is not necessary for the system 100 to have all of the elements shown in FIG. 1 or described herein. The system 100 can include a vehicle 200, a storage computing system 300, a user device 400, and a storage depot 500.

The vehicle 200, the storage computing system 300, the user device 400, and/or the storage depot 500 can be communicatively linked through one or more communication networks 110. As used herein, the term "communicatively linked" can include direct or indirect connections through a communication channel or pathway or another component or system. A "communication network" means one or more components designed to transmit and/or receive information from one source to another.

The one or more communication networks 110 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 110 further can be implemented as or include one or more wireless networks, whether short or long range. For example, in terms of short range wireless networks, the communication network 110 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 110 can include a mobile, cellular, and or satellite-based wireless network and support voice, video, text, and/or any combination thereof. Examples of long range wireless networks can include GSM, TDMA, CDMA, WCDMA networks or the like. The communication network 110 can include wired communication links and/or wireless communication links. The communication network 110 can include any combination of the above networks and/or other types of networks. The communication network 110 can include one or more routers, switches, access points, wireless access points, and/or the like.

The vehicle 200, the storage computing system 300, the user device 400, and/or the storage depot 500 can include and/or can execute suitable communication software, which enables the systems to communicate with each other through the communication network 110 and perform the functions disclosed herein.

Figure 2:
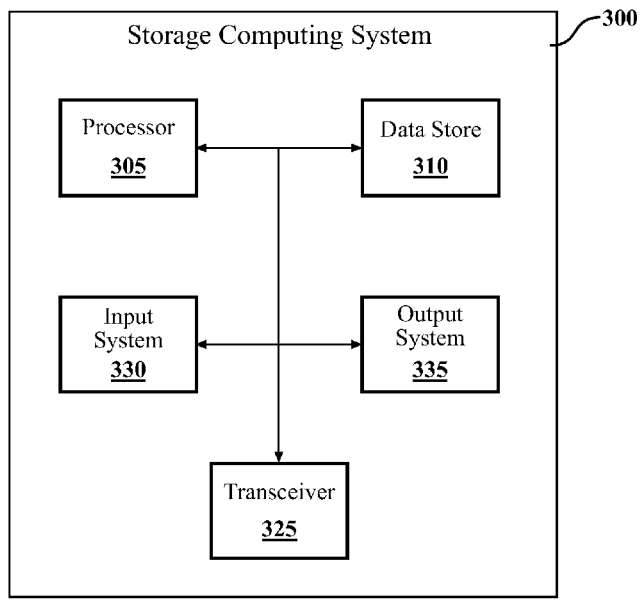
FIG. 2 is an example of a storage computing system.

Referring to FIG. 2, an example of the storage computing system 300 is shown. Some of the possible elements of the storage computing system 300 are shown in FIG. 2 and will now be described. It will be understood that it is not necessary for the storage computing system 300 to have all of the elements shown in FIG. 2 or described herein. The storage computing system 300 can have any combination of the various elements shown in FIG. 2. Further, the storage computing system 300 can have additional elements to those shown in FIG. 2. In some arrangements, the storage computing system 300 may not include one or more of the elements shown in FIG. 2. The various elements of the storage computing system 300 can be operatively connected to each other in any suitable manner. Further, the elements shown may be physically separated by large distances.

The storage computing system 300 can include one or more processors 305. "Processor" means any component or group of components that are configured to execute any of the processes described herein or any form of instructions to carry out such processes or cause such processes to be performed. The processor 305 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 305 can include at least one hardware circuit (e.g., an integrated circuit) configured to carry out instructions contained in program code. In arrangements in which there is a plurality of processors 305, such processors can work independently from each other, or one or more processors can work in combination with each other.

The storage computing system 300 can include one or more data stores 310 for storing one or more types of data. The data store 310 can include volatile and/or non-volatile memory. Examples of suitable data stores 310 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 310 can be a component of the processor 305, or the data store 310 can be operatively connected to the processor 305 for use thereby. The term "operatively connected," as used throughout this description, can include direct or indirect connections, including connections without direct physical contact.

The storage computing system 300 can include one or more transceivers 325. As used herein, "transceiver" is defined as a component or a group of components that transmit signals, receive signals or transmit and receive signals, whether wirelessly or through a hard-wired connection. The one or more transceivers 325 can be operatively connected to the one or more processors 305 and/or the one or more data stores 310.

The one or more transceivers 325 can enable communications between the storage computing system 300 and other remote devices or systems. The one or more transceivers 325 can be any suitable transceivers used to access a network, access point, node or other device for the transmission and receipt of data. The transceiver 325 may be a wireless transceiver using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The one or more transceivers 325 can include any wireless technology developed in the future. Again, the one or more transceivers 325 can be any suitable combination of transceivers, including any combination of the transceivers noted above.

The storage computing system 300 can include an input system 330. An "input system" is defined as any device, component, system, element or arrangement or groups thereof that enable information/data to be entered into a machine. The input system 330 can receive an input from an operator. Any suitable input system 330 can be used, including, for example, a keypad, display, touch screen, multi-touch screen, button, joystick, mouse, trackball, microphone and/or combinations thereof. The user device 400 can be the input system 330 for the storage computing system 300.

The storage computing system 300 can include an output system 335. An "output system" is defined as any device, component, system, element or arrangement or groups thereof that enable information/data to be presented to an operator. The output system 335 can present information/data to a vehicle occupant. The output system 335 can include a display. "Display" is defined as a component or a group of components that present visual data. Alternatively or in addition, the output system 335 may include a microphone, earphone and/or speaker. "Speaker" means one or more elements, one or more devices, one or more components, one or more systems, and/or any combination thereof that produce sound in response to an audio signal input. Examples of speakers include, for example, electroacoustic transducers, sound chips, and sound cards. Some components of the storage computing system 300 may serve as both a component of the input system 330 and a component of the output system 335.

The storage computing system 300 can have any suitable configuration. In one or more arrangements, the storage computing system 300 can be provided as a standalone unit. In one or more arrangements, the storage computing system 300 can be portable. The storage computing system 300 can be implemented in any one or more locations. While shown as separate elements in FIG. 1, the storage computing system 300 can be located at or formed integrally with, at least a portion of one or more other elements of FIG. 1. For instance, the storage system 300 can be physically located at one or more storage depots 500. In some arrangements, at least a portion of the storage computing system 300 can be incorporated with the user device 400 and/or the vehicle 200. In one or more arrangements, the storage computing system 300 can be a cloud-based computing service or the cloud. The "cloud" can include one or more remote servers.

Referring to FIG. 3, an example of the user device 400 is shown. Some of the possible elements of the user device 400 are shown in FIG. 3 and will now be described. It will be understood that it is not necessary for the user device 400 to have all of the elements shown in FIG. 3 or described herein. The user device 400 can have any combination of the various elements shown in FIG. 3. Further, the user device 400 can have additional elements to those shown in FIG. 3. In some arrangements, the user device 400 may not include one or more of the elements shown in FIG. 3. The various elements of the user device 400 can be operatively connected to each other in any suitable manner. Further, the elements shown may be physically separated by large distances.

The user device 400 can be any suitable device that a user of a shared vehicle can access. In one or more arrangements, the user device 400 can be a portable communication device. For example, the user device can be a telephone (e.g., a cellular telephone, a smart phone, etc.) a computer (e.g., a laptop, a tablet, a phablet, etc.), and/or any other a portable computing device. The user device 400 can be configured to communicate via a wireless medium. The user device 400 can include any suitable operating system.

In one or more arrangements, the user device 400 can be configured so as to be wearable by a user. For instance, the user device 400 can be a smart watch, smart eye glasses, smart jewelry (e.g., neckless, earrings, bracelets, etc.), and/or smart clothing (e.g., a shirt, hat, or other article of clothing enabled for wireless communication).

The user device 400 can include one or more processors 405, one or more data stores 410, an input system 430, an output system 435, and/or one or more transceivers 425. The above description of the one or more processors 305, the one or more data stores 310, the input system 330, the output system 335, and/or the one or more transceivers 325 presented in connection with the storage computing device 300 applies equally to the one or more processors 405, the one or more data stores 410, the input system 430, the output system 435, and/or the one or more transceivers 425, respectively, of the user device 400.

The user device 400 can include a navigation module 440. The navigation module 440 can include one or more mechanisms, device, elements, components, systems, applications, and/or combinations thereof, now known or later developed, configured to determine the geographic location of the user device 400 and/or the vehicle 200.

The navigation module 440 can include one or more mapping applications to determine a travel route. For instance, a user may input an origin and a destination. The mapping application can determine one or more suitable travel routes between the origin and the destination. A travel route may be selected based on one or more parameters (e.g., shortest travel distance, shortest amount of travel time, etc.). In some arrangements, the navigation module 440 can be configured to update the travel route dynamically as the user device 400 moves (e.g., when the user device 400 is located in the vehicle 200 and moves with the vehicle 200).

The navigation module 440 can include a global positioning system, a local positioning system or a geolocation system. The navigation module 440 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation module 440 can use Transmission Control Protocol (TCP) and/or a Geographic information system (GIS) and location services.

The navigation module 440 may include a transceiver configured to estimate a position of the user device 400 with respect to the Earth. For example, navigation module 440 can include a GPS transceiver to determine the vehicle's latitude, longitude and/or altitude. The navigation module 440 can use other systems (e.g., laser-based localization systems, inertial-aided GPS, and/or camera-based localization) to determine the location of the user device 400.

Alternatively or in addition, the navigation module 440 can be based on access point geolocation services, such as using the W3C Geolocation Application Programming Interface (API). With such a system, the location of the user device 400 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the user device 400 is determined will depend on the manner of operation of the particular location tracking system used.

Figure 4:
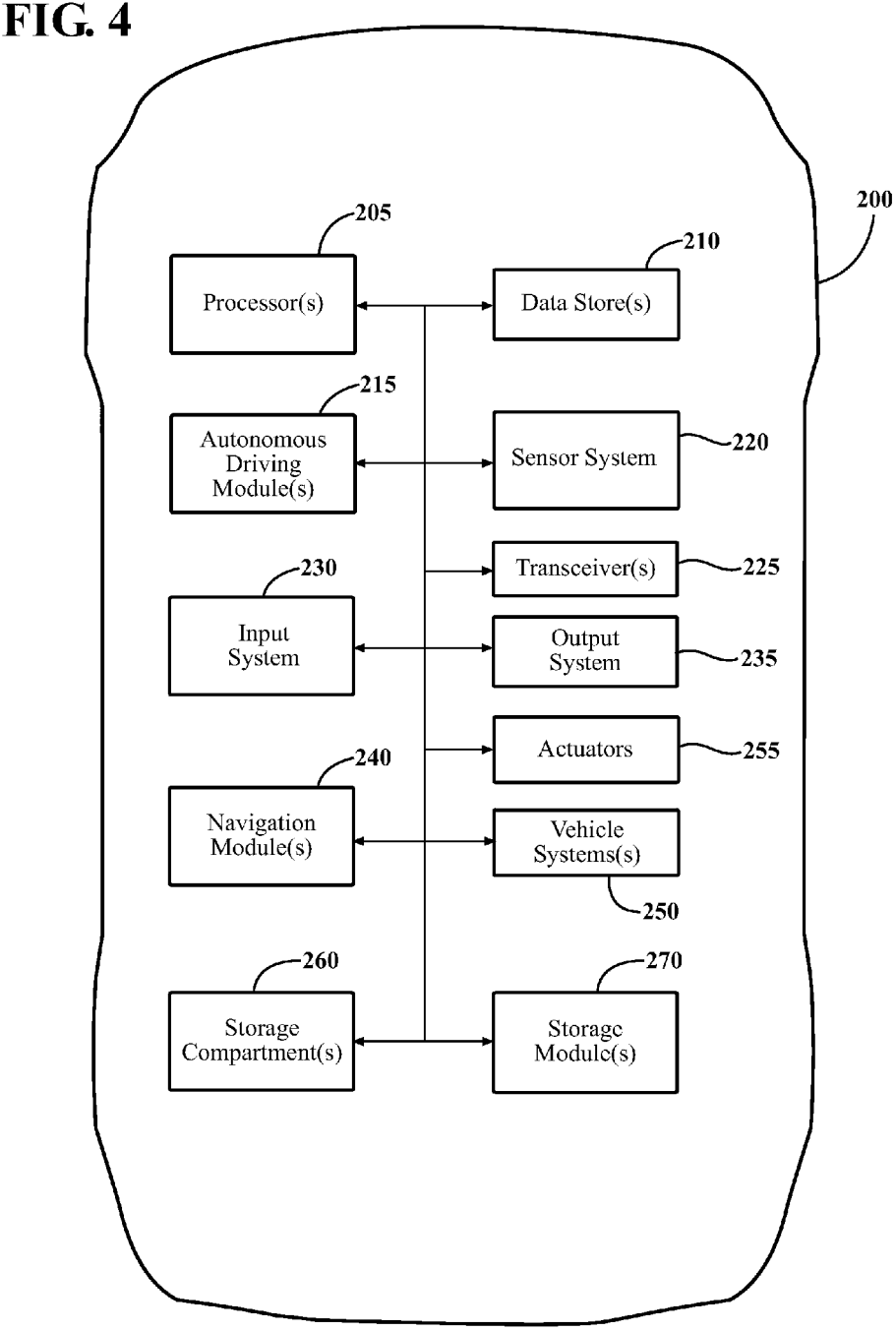
FIG. 4 is an example of an autonomous vehicle.

The vehicle 200 will now be described in greater detail. Referring to FIG. 4, an example of a vehicle 200 is shown. The vehicle 200 can be any suitable type of vehicle. As used herein, "vehicle" means any form of motorized transport. In one or more implementations, the vehicle 200 can be an automobile. While arrangements will be described herein with respect to automobiles, it will be understood that embodiments are not limited to automobiles. In some implementations, the vehicle 200 can be a watercraft, an aircraft, a space craft, a golf cart, or any other form of transport.

In one or more arrangements, the vehicle 200 can be a shared vehicle. As used herein, "shared vehicle" can include any vehicle that can be shared between two or more users. The two or more users can be related (e.g., by family relation, business relation, organization relation, school relation, group relation, etc.), or the two or more users may be otherwise unrelated except for the fact that they are sharing the same vehicle. For example, the vehicle 200 can be one of several shared vehicles that can be used by a user. The vehicle 200 can be rented, leased, or otherwise available for use by a user for a period of time and/or distance.

According to some arrangements described herein, the vehicle 200 can be an autonomous vehicle. As used herein, "autonomous vehicle" means a vehicle that configured to operate in an autonomous mode. "Autonomous mode" means that one or more computing systems are used to navigate and/or maneuver the vehicle with minimal or no input from a human driver. In one or more arrangements, the vehicle 200 can be highly automated.

The vehicle 200 can have one or more semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. The vehicle 200 can have a manual operational mode. "Manual operational mode" means that a substantial majority or all of the navigation and/or maneuvering of the vehicle is performed by a human driver with minimal or no input from a computing system.

The vehicle 200 can be configured to be switched between the various operational modes. Such switching can be implemented in any suitable manner, now known or later developed. The switching can be performed automatically, or it can be done responsive to receiving a manual input or request. In one or more arrangements, the vehicle 200 may be a non-autonomous vehicle that is configured to operate in only a manual operational mode. In such case, the vehicle can have one or more autonomous features, such as cruise control, adaptive cruise control, or lane keeping.

The vehicle 200 can include various elements. Some of the possible elements of the vehicle 200 are shown in FIG. 4 and will now be described. It will be understood that it is not necessary for the vehicle 200 to have all of the elements shown in FIG. 4 or described herein. The vehicle 200 can have any combination of the various elements shown in FIG. 4. Further, the vehicle 200 can have additional elements to those shown in FIG. 4. In some arrangements, vehicle 200 may not include one or more of the elements shown in FIG. 4. Further, while the various elements are shown as being located within the vehicle 200 in FIG. 4, it will be understood that one or more of these elements can be located external to the vehicle 200. Further, the elements shown may be physically separated by large distances.

The vehicle 200 can include one or more processors 205, one or more data stores 210, an input system 230, an output system 235, and/or one or more transceivers 225. The above description of the one or more processors 305, the one or more data stores 310, the one or more data stores 310, the input system 330, the output system 335, and/or the one or more transceivers 325 presented in connection with the storage computing system 300 applies equally to the one or more processors 205, the one or more data stores 210, the input system 230, the output system 235, and/or the one or more transceivers 225, respectively, of the vehicle 200. The vehicle 200 can include a navigation module 240. The above description of the navigation module 440 presented in connection with the user device 400 applies equally to the navigation module 240 of the vehicle 200.

The vehicle 200 can include one or more autonomous driving modules 215. The autonomous driving module 215 can be implemented as computer readable program code that, when executed by a processor, implement various processes described herein. Examples of such processes can include, for example, determining a travel route, directly or indirectly causing the determined travel route to be implemented, determining a driving maneuver, directly or indirectly causing the determined driving maneuver to be implemented, determining a modification to a current driving maneuver of the vehicle 200, and/or directly or indirectly causing a current driving maneuver of the vehicle 200 to be modified. The autonomous driving module 215 can be a component of the processor 205, or the autonomous driving module 215 can be executed on and/or distributed among other processing systems to which the processor 205 is operatively connected.

The autonomous driving module 215 can include instructions (e.g., program logic) executable by the processor 205. Such instructions can include instructions to execute various vehicle functions and/or to transmit data to, receive data from, interact with, and/or control the vehicle 200 or one or more systems thereof (e.g., one or more of vehicle systems 250). Alternatively or in addition, the data store 210 may contain such instructions. In one or more arrangements, the autonomous driving module 215 can include artificial or computational intelligence elements, e.g., neural network, fuzzy logic or other machine learning algorithms The vehicle 200 can include a sensor system 220. The sensor system 220 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process. The sensor system 220 and/or the one or more sensors can be operatively connected to the processor 205, the data store 210, the autonomous driving module 215 and/or other element(s) of the vehicle 200.

The sensor system 220 can include any suitable type of sensor. For example, the sensor system 220 can include one or more sensors configured to detect, determine, assess, monitor, measure, quantify and/or sense information about the vehicle 200. Alternatively or in addition, the sensor system 220 can include one or more sensors configured to detect, determine, assess, monitor, measure, quantify and/or sense information about the external environment in which the vehicle 200 is located, including information about objects in the external environment. Such objects may be stationary or moving objects. Some examples of sensors that can be included in the sensor system 220 can include RADAR sensors, LIDAR sensors, ultrasonic sensors, accelerometers, gyroscopes, and/or cameras.

Alternatively or in addition to any of the sensors described above, the sensor system 220 can include other types of sensors. The sensor system 220, the processor 205, the autonomous driving module 215, and/or other element(s) of the vehicle 200 can be configured to control movements or other aspects of one or more of the sensors of the sensor system 220. It should be noted that any of the sensors described herein can be provided in any suitable location with respect to the vehicle 200. For instance, one or more sensors can be located within the vehicle 200. Alternatively or in addition, one or more sensors can be located on the exterior of the vehicle 200. Still alternatively or in addition, one or more sensors can be located so as to be exposed to the exterior of the vehicle 200.

The vehicle 200 can include one or more vehicle systems 250. It should be appreciated that although particular vehicle systems can be separately discussed, each or any of the systems or portions thereof may be otherwise combined or segregated via hardware and/or software within the vehicle 200. For example, the vehicle 200 can include a propulsion system, a braking system, a steering system, a throttle system, a transmission system, and a signaling system. Each of such systems can include one or more mechanisms, device, elements, components, systems, applications, and/or combinations thereof, now known or later developed.

The processor 205 and/or the autonomous driving module 215 can be operatively connected to communicate with the various vehicle systems 250 and/or individual components thereof. For example, the processor 205 and/or the autonomous driving module 215 can be in communication to send and/or receive information from the various vehicle systems 250 to control the movement, speed, maneuvering, heading, direction, etc. of vehicle 200. The processor 205 and/or the autonomous driving module 215 may control some or all of these vehicle systems 250 and, thus, may be partially or fully autonomous.

The processor 205 and/or the autonomous driving module 215 may be configured to control the navigation and/or maneuvering of the vehicle 200 by controlling one or more of the vehicle systems 250 and/or components thereof. For instance, when operating in an autonomous mode, the processor 205 and/or the autonomous driving module 215 can control the direction and/or speed of the vehicle 200. The processor 205 and/or the autonomous driving module 215 can cause the vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 200 can include one or more actuators 255. The actuators 255 can be any element or combination of elements configured to modify, adjust and/or alter one or more of the vehicle systems 250 or components thereof to responsive to receiving signals or other inputs from the processor 205 and/or the autonomous driving module 215. Any suitable actuator can be used. For instance, the one or more actuators 255 can include motors, pneumatic actuators, hydraulic pistons, relays, solenoids, and/or piezoelectric actuators, just to name a few possibilities.

In one or more arrangements, the vehicle 200 can include one or more storage compartments 260. As used herein, "storage compartment" can include any physical structure configured to receive one or more personal belongings of a user of the vehicle 200. The storage compartment 260 can be configured to be located in one or more locations within the vehicle 200. For instance, the storage compartment 260 can be located in one or more locations in an occupant area of the vehicle 200 (e.g., a front seat, a center console, a back seat) and/or in one or more locations in a cargo area of the vehicle 200 (e.g., a trunk).

Figure 5:
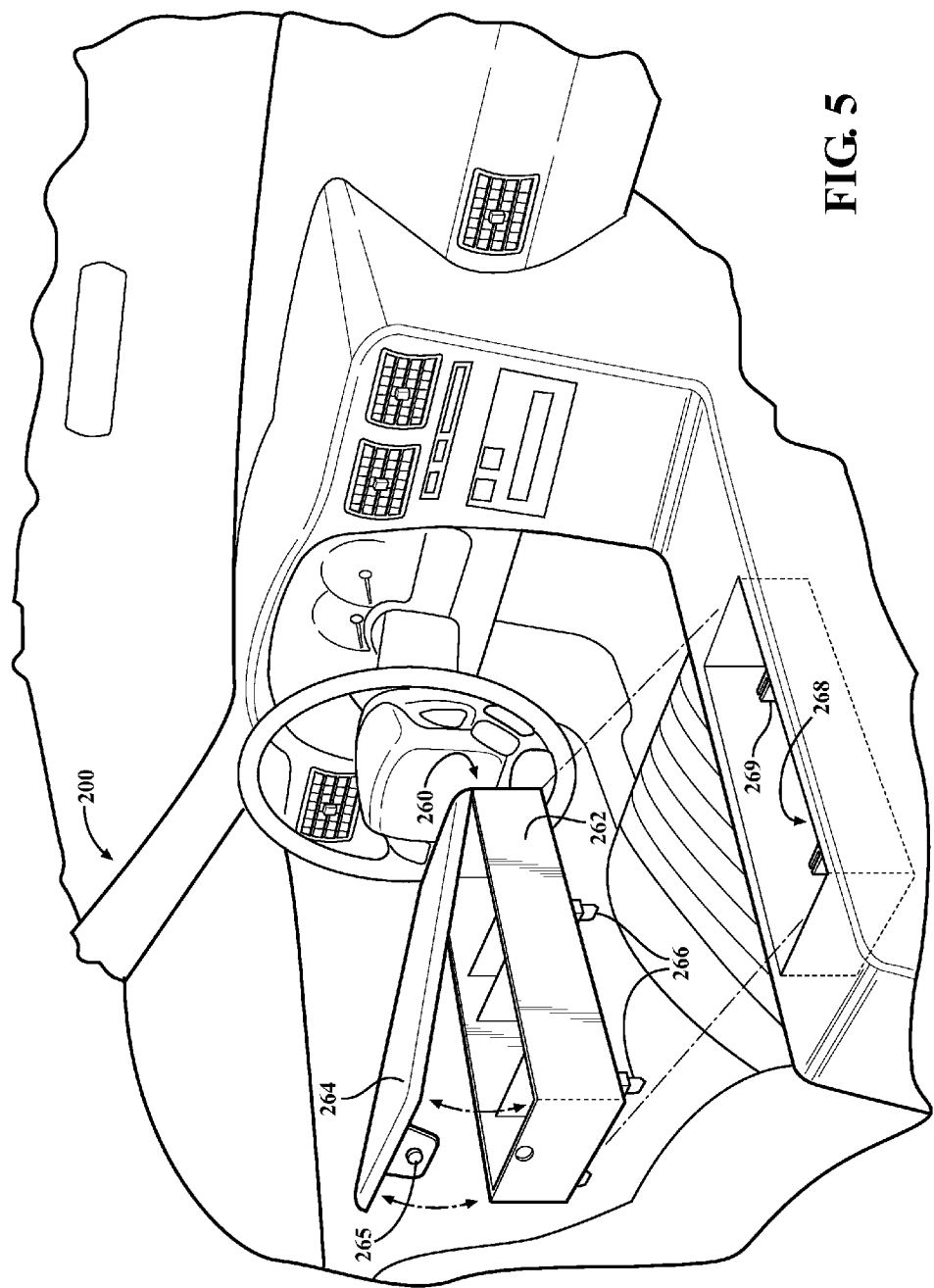
FIG. 5 is an example of an interior of a vehicle, showing a storage compartment located therein.

Referring to FIG. 5, the storage compartment 260 can be configured to be operatively connected to the vehicle 200. Operative connection between the storage compartment 260 and the vehicle 200 includes instances in which the storage compartment 260 is located within or on the vehicle 200 without connection or attachment to another structure. For instance, the storage compartment 260 can be supported on a seat, the floor, an interior surface, and/or an exterior surface of the vehicle 200 without any connection between them.

The storage compartment 260 can have any suitable size, shape, and/or configuration. For instance, the storage compartment 260 can be configured based on one or more factors, including, for example, safety, design, space, and/or material considerations or constraints. The storage compartment 260 can have any desired size, shape, and/or configuration to receive one or more items, such as personal belongings. In one example, the storage compartment 260 can be size, shape, and/or configuration to receive large items, such as tools, golf clubs, luggage, large shopping bags, and/or other sports equipment (e.g., hockey sticks, baseball bats, bowling balls, tennis racquets, pads, helmets, scuba tanks, etc.). In some arrangements, the storage compartment 260 can be sized, shaped, and/or configured for smaller personal items. In one or more arrangements, the storage compartment 260 can be provided as a standalone unit. In one or more arrangements, the storage compartment 260 can be portable.

In one or more arrangements, the storage compartment 260 can include one or more features to facilitate the organization of items therein. For instance, the storage compartment 260 can include one or more dividers, separators, compartments, walls, ledges, shelves, recesses, grooves, channels, and/or receptacles, just to name a few possibilities. In some arrangements, one or more of such features can be fixed. In some arrangements, one or more of such features can be movable to permit selective arrangement by a user.

The storage compartment 260 can be made of any suitable material. For example, the storage compartment 260 can be made of any suitable polymer and/or metal.

In one or more arrangements, the storage compartment 260 can be selectively removable from the vehicle 200. For instance, the storage compartment 260 can be selectively loaded and unloaded from the vehicle 200. As used herein, "loaded" or "loading" can include any placement of the storage compartment 260 in or on the vehicle 200. Loading can include operatively connecting the storage compartment 260 to a portion of the vehicle 200. Loading the storage compartment 260 can include positioning the storage compartment 260 within the vehicle 200. "Unload" or "unloading" can include any removal of the storage compartment 260 from the vehicle 200. For example, the storage compartment 260 can be unloaded by removing it from an interior or exterior portion of the vehicle 200. In one or more arrangements, when the vehicle 200 is a shared vehicle, the storage compartment 260 can be operatively connected to the vehicle 200 for a period of time in which a particular user is utilizing the vehicle 200 or is authorized to utilize the vehicle 200. The storage compartment 260 can be removed from the vehicle 200 when the user is not utilizing the vehicle 200 or at the end of the period of time in which the user is authorized to utilize the vehicle 200.

The storage compartment 260 and/or the vehicle 200 can be configured to facilitate the operative connection between the storage compartment 260 and the vehicle 200. For instance, the storage compartment 260 and/or the vehicle 200 can include one or more structures, male connectors, female connectors, protrusions, lugs, pins, receptacles, and/or recesses, etc. One or more of such features can be formed together with the storage compartment 260 and/or the vehicle 200 as a unitary structure, or one or more of such features can be formed separately from the storage compartment 260 and/or the vehicle 200 and operatively connected thereto in any suitable manner.

A non-limiting example of one manner of an operative connection between the storage compartment 260 and the vehicle 200 is shown in FIG. 5. In this example, the storage compartment 260 can include one or more male attachment members 266. The vehicle 200 can be configured such that it includes a storage receiving section 268. The storage receiving section 268 can be configured to engage and/or receive at least a portion of the storage compartment 260. In the arrangement shown in FIG. 5, the storage receiving section 268 can define a space into which at least a portion of the storage compartment 260 can be received. In one or more arrangements, the storage receiving section 268 can be a surface on which the storage compartment 260 is supported, but the storage compartment 260 is not received within the storage receiving section 268.

In some arrangements, the storage receiving section 268 can include one or more female attachment members 269. The female attachment members 269 can be configured to engage the male attachment members 266. The male attachment members 266 and/or the female attachment members 269 can have any suitable configuration. The male attachment members 266 and/or the female attachment members 269 can be configured for any form of mechanical engagement.

Further, it will be appreciated that the opposite of the arrangements shown in FIG. 5 can be provided. Thus, the storage compartment 260 can include one or more female attachment members 269, and the receiving section 268 can include one or more male attachment members 266. Again, it will be appreciated that the arrangements shown in FIG. 5 are merely provided an example and are not intended to be limiting.

In one or more arrangements, the storage compartment 260 can be located in a designated or predefined place within the vehicle 200. For instance, in one or more arrangements, the storage compartment 260 can be a center console storage compartment, as is shown in FIG. 5. In such case, the storage compartment 260 and/or the vehicle 200 can be configured to allow the storage compartment 260 to be positioned on or near the center console of the vehicle 200. The storage receiving section 268 can be located within the center console of the vehicle 200. However, alternative or additional locations for the storage receiving section 268 are possible.

For example, in one or more arrangements, the storage compartment 260 can be a trunk storage compartment. That is, the storage compartment 260 can be configured to be positioned within a trunk of the vehicle 200, or in some other cargo area (e.g., a rear cargo area or a front cargo area) of the vehicle 200.

Additionally or alternatively, the storage compartment 260 can be sized and/or shaped to engage at least a portion of the vehicle 200. For example, at least a portion of the storage compartment 260 can be configured to fit within one or more features or areas of the vehicle 200. In some arrangements, at least a portion of the storage compartment 260 can be sized and/or shaped to take the shape of a trunk, a rear cargo area, or a front cargo area of the vehicle 200. In some arrangements, at least a portion of the storage compartment 260 can be sized and/or shaped to fit within one or more cup holders located within the vehicle 200. Further, at least a portion of the storage compartment 260 can be sized and/or shaped to fit in existing storage compartments, such as a center console compartment of the vehicle 200.

In one or more arrangements, the storage compartment 260 can be configured to be operatively connected to a plurality of different vehicles. For example, the storage compartment 260 can be configured to be placed within or on a plurality of vehicles with different interior and/or exterior sizes, shapes, and/or configurations, and with features having different sizes, shapes, and/or configurations.

In one or more arrangements, the storage compartment 260 can include a base 262 and a lid 264 as shown in FIG. 5. The base 262 can be at least partially hollow. For instance, the base 262 can be configured to receive physical belongings. The lid 264 can be configured to cover, conceal, and/or otherwise protect the physical belongings within the base 262. The lid 264 can be attached to the base 262 in any suitable manner. For instance, the lid 264 can be pivotally attached to the base 262. As another example, the lid 264 can be slidably attached to the base 262. In one or more arrangements, the lid 264 can be attached to the base 262 by one or more fasteners and/or one or more forms of mechanical engagement.

In one or more arrangements, the storage compartment 260 can include one or more security features. For instance, the storage compartment 260 can be configured to be selectively locked and unlocked. To that end, the storage compartment 260 can include one or more locks 265. As used herein, "lock" includes any mechanical and/or electronic fastening device used to retain a storage compartment 260 in a closed or shut position. In one or more arrangements, the lock 265 can be released or unlocked in any suitable manner. For instance, the lock 265 can be released or unlocked by a key, a keycard, fingerprint, biometrics, RFID card, security token, electronic information, key code, password, etc. In one or more arrangements, the lock 265 can be configured to secure the storage compartment 260 by locking the lid 264 to the base 262, for example. In one or more arrangements, the lock 265 can be configured to secure the storage compartment 260 to the vehicle 200.

Referring back to FIG. 4, the vehicle 200 can include one or more storage modules 270. The storage module 270 can be implemented as computer readable program code that, when executed by a processor, implement the various processes described herein. The storage module 270 can be a component of the processor 205, or the storage module 270 can be executed on and/or distributed among other processing systems to which the processor 205 is operatively connected.

The storage module 270 can be configured to identify, detect, classify, determine, monitor, and/or assess conditions of the vehicle 200 as it relates to personal storage for one or more occupants. For example, the storage module 270 can identify, detect, classify, determine, monitor, and/or assess one or more storage characteristics of the storage compartment 260. As used herein, "storage characteristics" can include any information relating to a condition of the storage compartment 260.

In one or more arrangements, the storage characteristics can include whether the storage compartment 260 is installed or otherwise located in or on the vehicle 200. In one or more arrangements, the storage characteristics can include whether the storage compartment 260 is being utilized (e.g., whether objects are located within the storage compartment 260). In one or more arrangements, the storage characteristics can include whether the storage compartment 260 is in a locked configuration or an unlocked configuration.

The storage characteristics can be determined by the storage module 270 in any suitable manner. For example, the storage module 270 can receive information acquired by one or more sensors configured to monitor one or more conditions of the storage compartment 260. For instance, one or more sensors can be used to detect whether the storage container 260 is located within or on the vehicle 200. One or more sensors can be used to detect any objects are located within the storage compartment 260 or if the storage compartment 260 is empty. In one or more arrangements, the storage module 270 can receive information about one or more storage characteristics from an occupant, such as by using an input system 230 within the vehicle 200. Additionally or alternatively, the storage module 270 can receive information about one or more storage characteristics from the user device 400.

Figure 6:
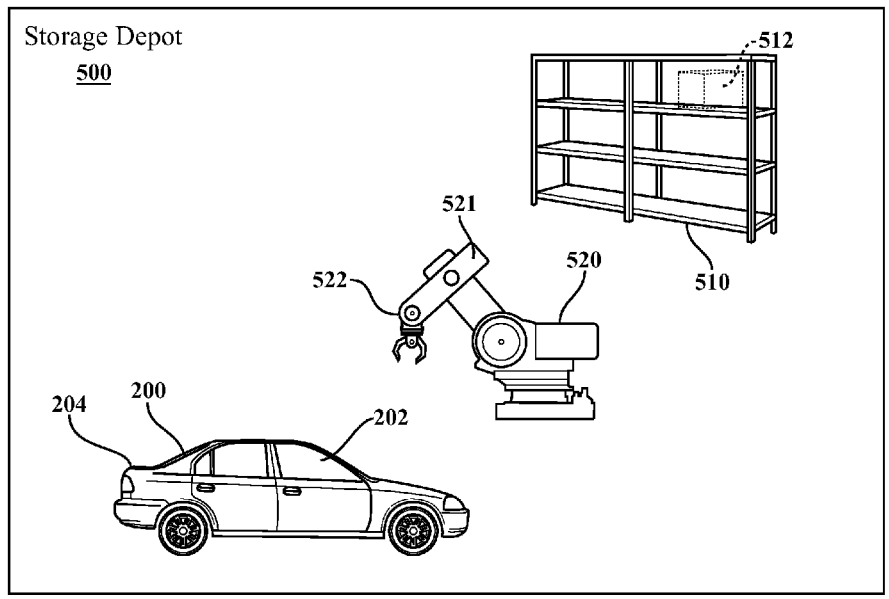
FIG. 6 is an example of a storage depot.

The storage depot 500 can now be described in greater detail. Referring to FIG. 6, an example storage depot 500 is shown. The storage depot 500 can have any suitable configuration to store personal belongings. It will be understood that it is not necessary for the storage depot 500 to have all of the elements shown in FIG. 6 or described herein. The storage depot 500 can have any combination of the various elements shown in FIG. 6. In one or more arrangements, the storage depot 500 can include one or more elements in addition to or as an alternative to one or more of the various elements shown in FIG. 6.

In one or more arrangements, the storage depot 500 can include storage space 510. As used herein, "storage space" means any physical area in which one or more storage compartments 260 can be stored. The storage space 510 can have any suitable configuration that allows the physical storage of the storage compartments 260. In some arrangements, the storage space 510 can be located indoors, such as in a warehouse for example. In other arrangements, the storage space 510 can be located outdoors.

The storage space 510 can have any suitable form. In some arrangements, the storage space 510 can include one or more individual spaces 512. Each individual space can be configured to receive one or more storage compartments 260. Examples of the storage space 120 can include a room, a bay, a shed, a dock, a closet, a box, a bin, a shelf, a cabinet, a drawer, a container, a rack, a case, or a compartment, just to name a few possibilities.

The storage space 510 can allow the storage containers 260 to be stored horizontally and/or vertically. For instance, the storage containers 260 can be stored substantially horizontally. As a non-limiting example of a substantially horizontal storage space, items can be stored on a single shelf or other support surface. Alternatively or in addition, the storage containers 260 can be stored substantially vertically by stacking the items 125 directly upon each other or in a spaced relation to each other. For instance, a plurality of storage containers 260 can be stored on a plurality of vertically spaced locations or spaces. As a non-limiting example of such vertically spaced storage spaces, items can be stored on a plurality of shelves.

Arrangements described herein can work in conjunction with one or more technologies to confirm the storage and retrieval of storage containers 260 from the storage space 510. Examples of such technologies can include barcodes, QR codes, GPS, RFID, and/or other technologies. In one or more arrangements, a unique identifier can be associated with one or more of the individual spaces 512. The identifier can be a name, a number, a letter, symbol, a bar code, RFID tag, or a QR code, just to name a few possibilities. Alternatively or in addition, the individual spaces 512 can have an associated transponder, signal beacon, GPS transmitter, and/or other location signaling technology. In one or more arrangements, one or more individual spaces 512 can be associated with, configured for, and/or reserved for a particular storage compartment 260, particular personal belongings, and/or a particular user. For example, the individual space 512 can be configured to store one particular storage compartment 260 and/or storage compartments or personal belongings of one particular user or group of users. In some arrangements, the individual spaces 512 can be configured store storage compartments 260 or personal belongings of several different users.

In one or more arrangements, the storage depot 500 can include one or more robots 520. As used herein, "robot" can include any mechanical or electro-mechanical device configured for interaction with the vehicle 200, the storage compartment 260, and/or the storage space 510. The robot 520 can be any type of robot now known or later developed. The robot 520 can provide automated transfer of storage compartments 260 to and from the vehicle 200 and/or storage space 510. For example, the robotic 520 can physically move personal belongings and/or the storage compartment 260 from the storage space 510 to the vehicle 200. Alternatively or in addition, the robotic 520 can physically move personal belongings and/or the storage compartment 260 from the vehicle 200 to the storage space 510. In some arrangements, the transfer of the storage compartment 260 can be automated. For example, the transfer can be controlled by the storage computing system 300. More particularly, the storage computing system 300 can send commands to the robot 520. Alternatively or in addition, the transfer can be controlled by other computing devices, such as the user device 400, the vehicle 200, or systems at the storage depot 500. In some instances, the transfer of the storage compartment 260 and/or personal belonging to and/or from the vehicle 200 can be performed by a human being (e.g., a forklift operator, a mover, etc.).

In one or more arrangements, the robot 520 can be configured to engage a storage compartment 260 within the vehicle 200. For example, the robot 520 can include an arm 521 and an end effector 522. "End effector" is any device, tool, instrument, or implement at the end of a robotic arm. The end effector 522 can be any suitable end effector configured to engage the storage compartment 260 and/or personal belongings. For example, the end effector 522 can be an impactive-type end effector, which can include, for example, jaws, claws, or gripper. In one or more arrangements, at least a portion of the robot 520 including the end effector 522 can be configured to enter an interior portion of the vehicle. For example, at least a portion of the robot 520 including the end effector 522 can be configured to pass through a vehicle window 202 and/or vehicle trunk 204.

The robotic arm 521 can be configured for movement in one or more directions. For instance, the robotic arm 521 can be configured for movement in a substantially horizontal direction, a substantially vertical direction, and/or combinations thereof. The robotic arm 521 can be configured to rotate about one or more axes. The robotic arm 521 can be configured to be selectively extended and retracted. Such extension and retraction of the robotic arm 521 can be achieved in any suitable manner, now known or later developed. In one or more arrangements, the robotic arm 521 and/or the end effector 522 can be configured for substantially universal movement. Further, the robot 520 can be configured to move in any suitable manner within the storage depot 500.

The storage depot 500 can have any suitable size, location, and/or configuration. In one or more arrangements, there can be a plurality of the storage depots 500 configured to store one or more storage compartments 260. The plurality of storage depots 500 can be distributed about an area in any suitable manner.

In one or more arrangements, the storage depot 500 can be located at, or incorporated with, a vehicle storage facility. For instance, the shared vehicle 200 can be stored at a vehicle storage facility when not in use.

In one or more arrangements, the storage depot 500 can be almost any commercial facility. For example, the storage depot 500 can be provided at or near a retail or wholesale facility. In one or more arrangements, the storage depot 500 can be provided at or near a shopping center or mall. In some arrangements, the storage depot 500 can store items purchased by a user of the shared vehicle 200 at the shopping center, while the user continues to shop. For example, a shopping trip can require multiple stops at different locations. The vehicle 200 can take purchased items to and from the storage depot 500 located at or near the shopping center.

In some arrangements, the storage depot 500 can be provided near a particular activity location. For example, the storage depot 500 can be located near a golf course. The vehicle 200 can be routed to the storage depot 500 before and after a round of golf to allow use and storage of a storage compartment 260 containing golf clubs and/or accessories.

In one or more arrangements, the storage depot can be associated with a particular housing group. For example, the storage depot 500 can be associated with an apartment building, condominium building or complex, a hotel, and/or housing community or neighborhood. Thus, the storage depot 500 can be available to residents of a particular housing group. The storage compartment 260 can be stored at the storage depot 500 to allow residents to have personal belongings when utilizing the shared vehicle 200.

According to arrangements described herein, the storage computing system 300 can be configured to receive a storage request 600. As used herein, "storage request" can be any signal or transmission relating to the storage of personal belongings, the storage compartment 260, and/or the vehicle 200 In one or more arrangements, the storage request 600 can be a request to change one or more storage characteristics of the storage compartment 260. In one or more arrangements, the storage request 600 can be a request to place the storage compartment 260 in or on the vehicle 200. In one or more arrangements, the storage request 600 can be a request to remove the storage compartment from the vehicle 200. In one or more arrangements, the storage request 600 can be a request to place the vehicle 200 in storage or to remove the vehicle 200 from storage.

The storage request 600 can be generated on and/or sent by any suitable source. In one or more arrangements, the storage request 600 can be generated on and/or sent by the vehicle 200. In one or more arrangements, the storage request 600 can be generated on and/or sent by the user device 400. In one or more arrangements, the storage request 600 can be generated on and/or sent by the storage depot 500.

The storage request 600 can be generated and/or sent at any suitable time. For instance, the storage request 600 can be generated and/or sent automatically at a particular time or upon the occurrence of a predetermined event or condition. As an example, the storage depot 500 can generate and/or send the storage request 600 when the storage depot 500 determines the vehicle 200 is either at the storage depot 500 or is scheduled to arrive at the storage depot 500. In one or more arrangements, the storage request 600 can be sent responsive to a user input or command. For instance, a vehicle user (e.g., the driver or passenger) can generate and/or send the storage request 600 using the user device 400.

The storage request 600 can be sent to the storage computing system 300 via the network 110. The storage computing system 300 can implement the storage request 600 or cause the storage request 600 to be implemented. For instance, the storage computing system 300 can forward the storage request 600 or a command consistent with the storage request 600 to one or more elements of the system 100, such as the vehicle 200 and/or the storage depot 500. The storage request 600 can include additional information, instructions, and/or requests. For instance, when the vehicle 200 is an autonomous vehicle, the storage request 600 can include a vehicle storage request (e.g., a request to store a vehicle or retrieve a vehicle from storage).

In one or more arrangements, the storage request 600 can include identification information. As used herein, "identification information" can include any information that identifies a particular user, a particular storage compartment, a particular storage depot, a particular storage space, and/or one or more particular individual spaces. The identification information can allow one or more systems to provide the user with an associated storage compartment and/or associated storage space. As used herein, "associated storage compartment" and "associated storage space" can include any storage compartment and/or storage space that is leased to a user, owned by a user, or otherwise provided for or made available to a user permanently or for a limited amount of time. The identification information can have any suitable form. For instance, the identification information can be a name, user ID, user password, PIN number, photo, etc. In one or more arrangements, the identification information associated with a user, storage space, and/or vehicle can be stored in any suitable location. For example, the identification information can be stored in one or more of the data stores 210, 310, 410 or other data store that is communicatively coupled to the storage depot 500, the vehicle 200, the user device 400, and/or the storage computing device 300.

In response to receiving the storage request 600, one or more storage parameters can be determined. The determination of storage parameters can include any determinations made regarding when, where, and/or how the storage characteristics of the storage compartment 260 can change. In some arrangements, the vehicle 200, the storage computing system 300, the user device 400, and/or the storage depot 500 can determine the storage parameters.

In one or more arrangements, determining the storage parameters can include determining or selecting the storage depot 500. The storage computing system 300 can, in response to the storage request 600, determine which storage depot the vehicle 200 should be routed to or taken from. Such a determination can be based on any one or more factors, including, for example, received identification information, proximity of the storage depot 500 to the vehicle 200, the proximity of the vehicle 200 to a user, the proximity of the storage depot 500 to an origin or a destination of a user, commercial facility, and/or a user destination. In some arrangements, there can be one or more storage depots associated with a particular user and/or a particular vehicle.

In one or more arrangements, determining the storage parameters can include determining an individual space 512 within the storage depot 500 in which to store a vehicle or a storage compartment 260, or from which to retrieve a vehicle or storage compartment. For instance, the storage computing device 300 and/or the storage depot 500 can determine which individual space 512 is associated with the user and/or the vehicle that sent the storage request 600. Such a determination can be made in any suitable manner and can be based on any one or more factors. For example, such a determination can be based on received identification information.

In one or more arrangements, determining the storage parameters can include determining a route for the vehicle 200. For instance, after a storage depot is determined, a target route for the vehicle 200 to take to the storage depot 500. In some arrangements, the vehicle 200 is an autonomous vehicle, and the determined route can be provided to one or more vehicle systems. For example, the determined route can be provided to the navigation module 240 and/or the autonomous driving module 215.

In one or more arrangements, the determination of storage parameters can include determining a target time for the vehicle 200 to be present at or taken from the storage depot 500. In one or more arrangements, the determination of storage parameters can include determining a target time for the vehicle 200 to be loaded or unloaded. For example, the loading or unloading of the vehicle 200 at the storage depot 500 can be scheduled for a certain time.

In one or more arrangements, the storage computing system 300 can be configured to send storage instructions 610. For example, the storage computing system 300 can send the storage instructions over the network 110. As used herein, "storage instructions" can include any signal or transmission instructing one or more systems, elements, and/or components to change the storage characteristics of a storage compartment 260, persona belongings, and/or the vehicle 200. The storage instructions 610 can be sent to the vehicle 200, the user device 400, the storage depot 500, and/or any combination thereof. The storage instructions 610 can be based on the determined storage parameters, including one or more of those described above.

In one or more arrangements, the storage instructions 610 can be received by the vehicle 200. In one or more arrangements, the storage instructions 610 can instruct the vehicle 200 to navigate to a particular storage depot 500. For example, the storage instructions 610 can include information identifying the storage depot 500. The identifying information can include, for example, location data of the storage depot 500. The storage instructions 610 can also include route information to an autonomous vehicle 200. Further, the storage instructions 610 can include time information, such as a desired time in which the vehicle 200 can be at the storage depot 500.

In one or more arrangements, the storage instructions 610 can be received by the user device 400. The storage instructions 610 can indicate to a user, through the user device 400, instructions relating to the storage of the storage compartment 260. For example, the storage instructions 610 can instruct the user to navigate the vehicle 200 to the storage depot 500.

In one or more arrangements, the storage instructions 610 can be received by the storage depot 500. The storage instructions 610 can include instructions on how the storage depot 500 should operate. For example, the storage instructions 610 can include instructions to load the storage compartment 260 in or on vehicle 200 and/or to unload the storage compartment 260 from the vehicle 200. The storage instructions 610 can also include instructions on where the storage compartment 260 should be stored within the storage depot 500. For example, the storage instructions 610 can instruct the storage depot 500 to store the storage compartment 260 in an associated individual space 512.

In one or more arrangements, the storage request 600 and/or the storage instructions 610 can be sent using encrypted signals. For example, the identification information can be encrypted. As used herein, encrypted signals can include any encoded message such that authorized systems or parties can access it. For example, the storage request 600 and/or the storage instructions 610 can be encrypted using any suitable form of encryption technology, including, for example, symmetric key encryption and/or public key encryption. In some arrangements, the authorized systems can include the vehicle 200, the storage computing system 300, the user device 400, and/or the storage depot 500.

A non-limiting example of these arrangements will now be described. A user can send the storage request 600 from the user device 400. In this particular example, the storage request 600 can be a request to retrieve the storage compartment 260 and can include a request for use of a shared vehicle at a particular location. The storage request 600 can be received by the storage computing system 300, which, in turn, can forward the storage request 600 or send commands consistent with the storage request 600 to the vehicle 200 and/or the storage depot 500. In this example, the vehicle 200 can be an autonomous vehicle. When the vehicle 200 is or becomes available, the vehicle 200 can be configured to implement the storage request 600, such as by autonomously navigating to the storage depot 500. At the storage depot 500, the storage computing system 300 can cause the storage compartment 260 to be retrieved from storage and to be operatively connected to the vehicle 200. The storage computing system 300 can cause the vehicle 200 to autonomously navigate to the user at the indicated location.

Another non-limiting example will now be described. For purposes of this example, the storage request 600 can be a request to remove the storage compartment 260 from the vehicle 200 and to store the storage compartment 260 for a period of time. The storage request 600 can specify a user destination. In this example, the vehicle 200 can be an autonomous vehicle. The storage request 600 can be sent by the vehicle 200 and/or the user device 400. The storage request 600 can include instructions indicating the user is done using the vehicle 200.

The storage request 600 can be received by the storage computing system 300, which, in turn, can forward the storage request 600 or send commands consistent with the storage request 600 to the vehicle 200. The vehicle 200 can be configured to implement the storage request 600, such as by autonomously navigating to the user destination. After the user has exited the vehicle 200 at the user destination, the vehicle 200 can autonomously navigate to the storage depot 500. The storage depot 500 can be selected in any suitable manner. For instance, the storage depot 500 can be automatically selected based on one or more parameters (e.g., the closest storage depot relative to the intended destination of the user). At the storage depot 500, the storage computing system 300 can cause the storage compartment 260 to be retrieved from the vehicle 200, such as by one or more robots 520. The vehicle 200 can automatically implement one or more actions to facilitate such retrieval, such as by opening one or more windows or by opening the trunk. After the storage compartment 260 has been retrieved from the vehicle 200, the storage computing system 300 can cause the vehicle 200 to autonomously navigate to a designated spot in the storage depot 500, to a different vehicle storage facility, or to a pick up location for a different user.

Figure 7:
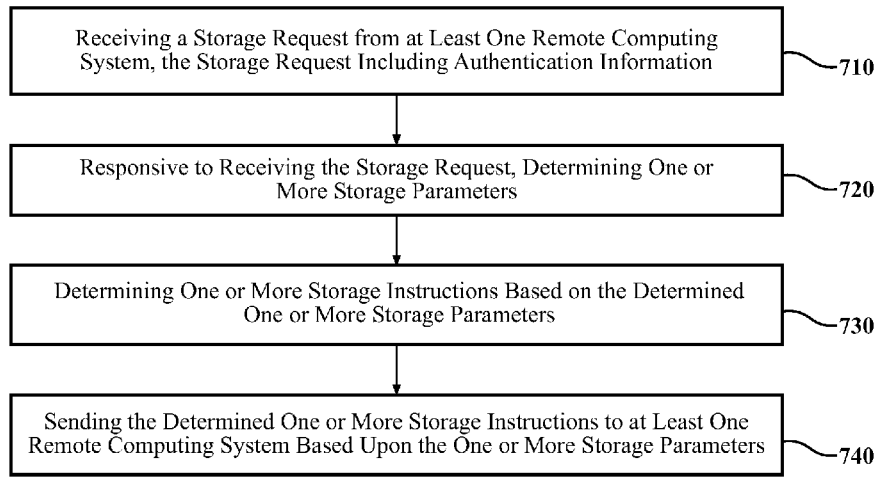
FIG. 7 is an example of a method for managing personal storage for shared vehicles.

Now that the various potential systems, devices, elements and/or components of the vehicle 200, storage unit 300, user device 400, and the storage depot 500 have been described, various methods of for personal storage for shared vehicles will now be described. Referring now to FIG. 7, an example of a method for managing personal storage for shared vehicles is shown. Various possible steps of method 700 will now be described. The method 700 illustrated in FIG. 7 may be applicable to the embodiments described above in relation to FIGS. 1-6, but it is understood that the method 700 can be carried out with other suitable systems and arrangements. Moreover, the method 700 may include other steps that are not shown here, and in fact, the method 700 is not limited to including every step shown in FIG. 7. The steps that are illustrated here as part of the method 700 are not limited to this particular chronological order. Indeed, some of the steps may be performed in a different order than what is shown and/or at least some of the steps shown can occur simultaneously.

At block 710, a storage request can be received from at least one remote computing system. In one or more arrangements, the storage request is received at the storage computing system 300. As described above, the storage request can be generated by and/or sent by the vehicle 200, the user device 400, and/or the storage depot 500. The storage request can include identification information. The identification information can include any information that identifies a particular user, vehicle, storage compartment, storage depot, and/or storage space. For example, the identification information can include a user identification and a storage compartment identification. The method 700 can continue to block 720.

At block 720, responsive to receiving the storage request, one or more storage parameters can be determined. In some arrangements, the storage parameters can be determined by the storage computing system 300. In one or more arrangements, the determination of the storage parameters can include determining whether the storage compartment 260 should be transferred to, or from, the vehicle 200. The determination of the storage parameters can include determining storage depot information. For instance, the storage parameters can include the location of the storage depot 500. The method can continue to block 730.

At block 730, one or more storage instructions can be determined. Such a determined can be based on the determined one or more storage parameters. In some arrangements, the storage parameters can be determined by the storage computing system 300. In one or more arrangements, the storage instructions can include a time and a location in which the vehicle 200 should be at a storage depot 500. In arrangements in which the vehicle 200 is an automated vehicle, the storage instructions can be configured to cause movement of the automated vehicle 200 to the storage depot 500. For example, the storage instructions can include information to allow the autonomous driving module 215 to control the navigation and/or maneuvering of the vehicle 200. The method can continue to block 740.

At block 740, the determined one or more storage instructions can be sent to at least one remote computing system based on the one or more storage parameters. In some arrangements, the storage computing system 300 can be configured to send the storage instructions. The storage computing system 300 can send the storage instructions to the vehicle 200, the user device 400, and/or the storage depot 500.

In one or more arrangements, the storage instructions can include information that instructs the user, vehicle 200, and/or the storage depot 500 to load or unload personal belongings or storage compartments when the vehicle 200 is at the storage depot 500. For example, the storage instructions 610 can instruct the storage depot 500 to automatically load or unload the vehicle 200. For example, the storage instructions 610 can include information that can allow the robotics 520 to automatically load or unload the storage compartment 260 from the vehicle 200.

The method 700 can end. Alternatively, the method 700 can return to block 710. As a further alternative, the method 700 can include additional and/or alternative blocks (not shown).

Referring now to FIG. 8, another example of a method for managing personal storage for shared vehicles is shown. Various possible steps of method 800 will now be described. The method 800 illustrated in FIG. 8 may be applicable to the embodiments described above in relation to FIGS. 1-6, but it is understood that the method 800 can be carried out with other suitable systems and arrangements. Moreover, the method 800 may include other steps that are not shown here, and in fact, the method 800 is not limited to including every step shown in FIG. 8. The steps that are illustrated here as part of the method 800 are not limited to this particular chronological order. Indeed, some of the steps may be performed in a different order than what is shown and/or at least some of the steps shown can occur simultaneously.

At block 810, storage characteristics of a storage compartment can be determined. In one or more arrangements, the storage characteristics can be determined by the vehicle 200. In one or more arrangements, the storage characteristics can be determined by a user, such as by the user device 400, for example. The storage characteristics can be determined by vehicle sensors within the vehicle 200. The method can continue to block 820.

At block 820, a storage request can be sent to at least one remote computing system, wherein the storage request can include identification information. In one or more arrangements, the vehicle 200 and/or the user device 400 can send the storage request 600. The storage request 600 can be sent to the storage computing device 300 and/or the storage depot 500. The storage request 600 can be based on the determined storage characteristics of the storage compartment 260. The method can continue to block 830.

At block 830, storage instructions can be received from at least one remote computing device. In one or more arrangements, the storage instructions 610 can be received by the vehicle 200 and/or the user device 400. The storage instructions 610 can, in some examples, include temporal and/or location information. For example, the storage instructions 610 can instruct the vehicle 200 to be routed to the storage depot 500 at a particular time. The method 800 can end. Alternatively, the method 800 can return to block 810. As a further alternative, the method 800 can include additional and/or alternative blocks (not shown).

A non-limiting example of managing personal storage with shared vehicles in accordance with systems and methods described herein will now be presented. A user may have the user device 400, such as a smartphone or other portable communication device. Using the user device 400, the user can request a shared vehicle for transportation, such as the vehicle 200. Further, the user can request one or more storage compartments 260 to be accessible within the vehicle 200. The storage request 600 can include identification information that can identify the user, the vehicle 200, and/or the storage compartment 260.

The storage computing system 300 can receive the storage request 600 from the user. The storage computing system 300 can be, for example, located at a storage depot or in a cloud-based computing system (e.g., a remote server). The storage computing system 300 can determine one or more storage parameters based on the storage request 600. For example, the storage computing system 300 can determine one or more of a storage depot, storage space, individual space, and/or storage compartment that is associated with the user. That is, the storage computing system 300 can determine the storage compartment 260 to be used by the user, and its location within the particular storage depot 500. In response to determining the storage parameters, the storage computing system 300 can send storage instructions 610 to one or more computing systems.

At least a portion of the storage instructions 610 can be sent to the vehicle 200. The vehicle 200 can be an autonomous vehicle configured for operation in an autonomous mode. The storage instructions can include the location of the storage depot 500 and a time the vehicle 200 should be at the storage depot 500. In response to receiving storage instructions 610, the vehicle 200 can automatically navigate to the storage depot 500.

A portion of the storage instructions 610 can be sent to the storage depot 500. They can instruct the storage depot 500 to load the storage compartment 260 into the vehicle. The storage instructions 610 can include identifying information for the storage compartment 260, the storage space 510, the individual space 512, and/or the vehicle 200. The instructions can cause the storage depot 500 to automatically load the storage compartment 260 into the vehicle 200. For example, the storage instructions 610 can instruct the one or more robots 520 to transfer the storage compartment 260 from the storage space 510 and into operative connection with the vehicle 200.

The vehicle 200 can be configured to autonomously navigate to the user. The user can utilize the vehicle 200 for a period of time. The vehicle 200 can drop off the user at a desired destination. The user, through the user device 400, and/or the vehicle 200 can send a storage request 600. The storage request 600 can include a request to store the storage compartment 260.

The storage computing system 300 can receive the storage request 600 and determine one or more storage parameters. For example, the storage computing system 300 can determine the storage depot 500 for storage of the storage compartment 260. The storage computing system 300 can send storage instructions 610. The storage instructions 610 can be received by the vehicle 200 and/or the storage depot 500. The vehicle 200 can receive instructions to navigate to the storage depot 500. The storage depot 500 can receive instructions to remove the storage compartment 260 and position the storage compartment 260 within an individual space 512 via the one or more robots 520.

Another non-limiting example of managing personal storage will now be presented, wherein the shared vehicle can be a shared golf cart. The vehicle 200 can be a golf cart configured to move occupants and their belongings around a golf course. The golf cart vehicle 200 can be configured for autonomous or manual driving modes. A user can request the golf cart for transportation while at a golf facility, either through the user device 400 or other facility resources. Further, the user can request one or more storage compartments 260 to be accessible within the golf cart. The storage request 600 can include identification information that can identify the user, the golf cart, and/or the storage compartment 260.

The storage compartment 260 can be any suitable compartment for the golf cart. For instance, the storage compartment 260 can be configured to store golf clubs and/or golf attire. In other examples the storage compartment 260 can be configured to store smaller personal belongings. In some examples, the storage compartment 260 can be configured to store food and/or beverages for the user. The user can pre-select food and beverage options to have in their storage compartment 260. The storage request 600 can be a request to provide a user with a golf cart pre-loaded with the associated storage compartment(s) 260.

The storage computing system 300 can receive the storage request 600 from the user, golf course personnel, and/or a computing system located at the golf facility. For example, a pro shop at the golf course can send the storage request 600 when a user checks in. The storage computing system 300 can be, for example, located at a golf course storage depot or in a cloud-based computing system (e.g., a remote server). The storage computing system 300 can determine one or more storage parameters based on the storage request 600. For example, the storage computing system 300 can determine one or more of a storage depot, storage space, individual space, and/or storage compartment that is associated with the user. That is, the storage computing system 300 can determine the storage compartment 260 to be used by the user, and its location within the particular storage depot 500. In response to determining the storage parameters, the storage computing system 300 can send storage instructions 610 to one or more computing systems.

At least a portion of the storage instructions 610 can be sent to the golf cart and/or user device 400. The storage instructions can include the location of the storage depot 500 and a time the vehicle 200 should be at the storage depot 500. For example, the storage depot 500 can be a pro shop, a golf club storage area, and/or restaurant/bar. In response to receiving storage instructions 610, the golf cart can automatically navigate to the storage depot 500 or the user can operate the golf cart to the storage depot 500.

A portion of the storage instructions 610 can be sent to the storage depot 500. They can instruct the storage depot 500 to load the storage compartment 260 into the golf cart. The storage instructions 610 can include identifying information for the storage compartment 260, the storage space 510, the individual space 512, and/or the golf cart. The instructions can cause the storage depot 500 to automatically load the storage compartment 260 into the golf cart. For example, the storage instructions 610 can instruct the one or more robots 520 to transfer the storage compartment 260 from the storage space 510 and into operative connection with the golf cart.

The storage computing system 300 can receive the storage request 600 and determine one or more storage parameters. For example, the storage computing system 300 can determine the storage depot 500 for storage of the storage compartment 260. The storage computing system 300 can send storage instructions 610. The storage instructions 610 can be received by the golf cart and/or the storage depot 500. The golf cart can receive instructions to navigate to the storage depot 500. The storage depot 500 can receive instructions to remove the storage compartment 260 and position the storage compartment 260 within an individual space 512 via the one or more robots 520.

It will be appreciated that arrangements described herein can provide numerous benefits, including one or more of the benefits mentioned herein. The transfer of personal belongings manually can be inconvenient for users of shared vehicles. For example, there can be a small set of personal items that are commonly used in the vehicle such as sunglasses, hand cleaner, tissues, music, snacks, that would be hard to transfer by hand each time using a vehicle. Furthermore, there can be shopping trips requiring stops at more than one location with potentially bulky items that would be difficult to transport by hand and carry through subsequent stores. There can also be larger personal items that a user may want for activities during the day, such as sports equipment for after work activities. Arrangements described herein can improve the ability for occupants to store personal belongings in shared vehicles. Arrangements described herein can provide the ability to store personal belongings in storage compartments within shared vehicles. The storage compartments can be transferred in and out of a shared vehicle. For instance, the storage compartment corresponding to a user can be added to the shared vehicle the user is using. After a user is finished with the shared vehicle, the storage compartment can be removed from the vehicle and stored at a storage depot for future access. Arrangements described herein can be implemented with autonomous vehicles. The autonomous vehicles can be configured to be routed to and from a storage depot to transfer a storage compartment. Arrangements can include robotics within the storage depot to automate the loading and/or unloading of the storage compartment. Further, arrangements described herein can provide secure storage of belongings by including identification information to make sure a user has access to an associated storage compartment.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending on the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of managing personal storage for a shared autonomous vehicle, the method comprising:
   receiving, by one or more computing devices, a storage request and a user destination request from a user device, the storage request including identification information for at least one of a user and an associated storage compartment, and the user destination request including a user destination and a user pick up location, the user destination and the user pick up location having different locations;
   responsive to receiving the storage request, determining one or more storage parameters, the one or more storage parameters including a storage depot, the storage depot being located at a different location than that of the user destination and the user pick up location;
   determining one or more storage instructions based on the determined one or more storage parameters, the storage instructions including instructions to move the associated storage compartment from a storage space to the shared autonomous vehicle;
   causing the shared autonomous vehicle to be autonomously moved to the storage depot based on the one or more storage parameters;
   causing the associated storage compartment to be moved from the storage space to the shared autonomous vehicle based on the storage instructions; and
   causing the shared autonomous vehicle to be autonomously moved to the user destination.

2. The method of claim 1, wherein the storage instructions further include a location of the storage depot and the method further includes sending the determined one or more storage instructions to the shared autonomous vehicle.

3. The method of claim 2, wherein the storage instructions further include a time in which the shared autonomous vehicle should be moved to the storage depot.

4. The method of claim 1, further including the step of:
   causing the shared autonomous vehicle to be autonomously moved to a location of the user after the causing of the storage compartment to be moved from the storage space to the shared autonomous vehicle.

5. The method of claim 1, wherein the storage parameters further include a particular storage space within the storage depot for storage of the storage compartment.

6. The method of claim 1, further including the step of:
   sending the determined one or more storage instructions to a computing system at the storage depot, the computing system at the storage depot communicatively linked to one or more robots.

7. The method of claim 6, wherein the causing the storage compartment to be moved from the storage space to the shared autonomous vehicle includes causing the one or more robots to move the storage compartment from the storage space to the shared autonomous vehicle.

8. The method of claim 7, further including the step of:
   adjusting at least one of a vehicle window and a vehicle door to allow the one or more robots access to the storage compartment.

9. A system for managing personal storage for a shared autonomous vehicle, the system comprising:
   one or more processors communicatively linked to at least one remote computing system at a storage depot, the one or more processors being programmed to initiate executable operations comprising:
      responsive to receiving a storage request from a user device including identification information for at least one of a user and an associated storage compartment, determining one or more storage parameters, the one or more storage parameters including a storage depot;
      determining one or more storage instructions based on the determined one or more storage parameters, the storage instructions including instructions to move the associated storage compartment from a storage space to an autonomous vehicle;
      causing the shared autonomous vehicle to be autonomously moved to the storage depot based on the one or more storage parameters;
      causing the associated storage compartment to be moved from the storage space to the shared autonomous vehicle based on the storage instructions; and
      responsive to receiving a user destination request from the user device, the user destination request including a user destination and a user pick up location, causing the shared autonomous vehicle to be autonomously moved to the user destination,
      wherein the storage depot, the user destination, and the user pick up location are all at different locations.

10. The system of claim 9, wherein the one or more processors includes a processor of the shared autonomous vehicle.

11. The system of claim 9, wherein the one or more processors includes a cloud-based processor.

12. The system of claim 9, further including one or more robots, the one or more robots being configured to move the storage compartment to be moved from the storage space to the shared autonomous vehicle in response to the executable operations initiated by the one or more processors.

13. A method of managing personal storage for a shared autonomous vehicle, the method comprising:
receiving, by one or more computing devices, a storage request and a user destination request from a user device, the storage request including identification information for at least one of a user and an associated storage compartment, and the user destination request including a user destination and a user pick up location, the user destination and the user pick up location having different locations;
responsive to receiving the storage request, determining one or more storage parameters, the one or more storage parameters including a storage depot, the storage depot being located at a different location than that of the user destination and the user pick up location;
determining one or more storage instructions based on the determined one or more storage parameters, the storage instructions including instructions to move the associated storage compartment from the shared autonomous vehicle to a storage space;
causing the shared autonomous vehicle to be autonomously moved to the storage depot based on the one or more storage parameters;
causing the associated storage compartment to be moved from the shared autonomous vehicle to the storage space based on the storage instructions; and
causing the shared autonomous vehicle to be autonomously moved to the user destination.

14. The method of claim 13, wherein the storage instructions further include a location of the storage depot and the method further includes sending the determined one or more storage instructions to the shared autonomous vehicle.

15. The method of claim 13, wherein the storage instructions further include a time in which the shared autonomous vehicle should be routed to the storage depot.

16. The method of claim 13, further including the step of:
causing the shared autonomous vehicle to be autonomously moved to a location of the user after the causing the storage compartment to be moved from the storage space to the shared autonomous vehicle.

17. The method of claim 13, wherein the storage parameters further include a particular storage space within the storage depot for storage of the storage compartment.

18. The method of claim 13, wherein the causing the storage compartment to be moved from the shared autonomous vehicle to the storage space includes causing one or more robots to move the storage compartment from the shared autonomous vehicle to the storage space.

19. The method of claim 18, further including the step of:
adjusting at least one of a vehicle window and a vehicle door to allow the one or more robots access to the storage compartment.

20. The method of claim 13, further including the step of:
determining storage characteristics of the storage compartment operatively connected to the shared vehicle, the determining one or more storage parameters being based at least in part on the storage characteristics.

21. The method of claim 20, wherein the storage characteristics include at least one of: whether the storage compartment is locked or unlocked or whether the storage compartment is being utilized or is not being utilized.

22. A system for managing personal storage for a shared autonomous vehicle, the system comprising:
one or more processors communicatively linked to at least one remote computing system at a storage depot, the one or more processors being programmed to initiate executable operations comprising:
responsive to receiving a storage request from a user device including identification information for at least one of a user and an associated storage compartment, determining one or more storage parameters, the one or more storage parameters including a storage depot;
determining one or more storage instructions based on the determined one or more storage parameters, the storage instructions including instructions to move the associated storage compartment from the shared autonomous vehicle to a storage space;
causing the shared autonomous vehicle to be autonomously moved to the storage depot based on the storage parameters;
causing the associated storage compartment to be moved from the shared autonomous vehicle to the storage space based on the storage instructions; and
responsive to receiving a user destination request from the user device, the user destination request including a user destination and a user pick up location, causing the shared autonomous vehicle to be autonomously moved to the user destination,
wherein the storage depot, the user destination, and the user pick up location are all at different locations.

23. The system of claim 22, wherein the one or more processors includes at least one of a processor of the shared autonomous vehicle and a cloud-based processor.

24. The system of claim 22, further including one or more robots, the one or more robots being configured to move the storage compartment from the shared autonomous vehicle to the storage space in response to the executable operations initiated by the one or more processors.

* * * * *